United States Patent Office 2,788,359
Patented Apr. 9, 1957

2,788,359

CYCLOHEXADIENE PHOSPHATE AND THIOPHOSPHATE ESTERS

Christoph J. Grundmann and Rudi F. W. Rätz, Columbus, Ohio, assignors to Olin Mathieson Chemical Corporation, a corporation of Virginia No Drawing. Application July 20, 1955, Serial No. 523,348

2 Claims. (Cl. 260—461)

This invention relates to novel phosphoric acid esters and their use as insecticides. More particularly, the novel phosphoric acid esters have the general formula:

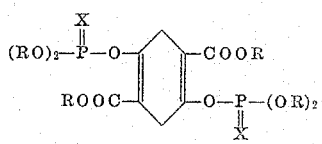

where X is oxygen or sulfur and the R's are alkyl groups which have from 1 to 5 carbon atoms and which can be the same or different. A specific chemical compound falling within the scope of the aforementioned general formula is 1,4-dicarbethoxycyclohexadien - 1,4 - yl - 2,5-bis-diethyl phosphate.

The products of the present invention are generally prepared by reacting an alkali metal, usually sodium, with a suitable alkyl succino-succinate to form the disodium salt of the succinylo-succinic ester in the case where the alkali metal used is sodium. This salt is then reacted with a suitable dialkyl halophosphate or dialkylhalothionophosphate, the halogen generally being chlorine, to form the compounds of this invention, which are generally oils not distillable without decomposition even in high vacuum.

The products of the present invention are useful for the purpose of combating a wide variety of insects, including pea aphids, cotton aphids and Mexican bean beetles.

In use as insecticides, the novel esters are suitably formulated as dusts, wettable powders or emulsifiable concentrates. Siliceous clays in finely divided form are suitable diluents for dusts. An example of such an insecticidal dust is an intimate mixture of 5 weight percent of the product of Example I uniformly dispersed on 95 weight percent of attapulgite.

A 50 percent wettable powder can be prepared having the following composition:

| Component: | Percent by weight |
|---|---|
| Product of Example I | 50 |
| "Attaclay" | 40 |
| "MXP" ( a proprietary mixture being about ½ diatomaceous earth and ½ polyoxyethylated tall oil) | 5 |
| Glue (Armour Sticker) | 5 |
|  | 100 |

An example of an emulsifiable concentrate is a solution of 10 weight percent of the product of Example I, 85 weight percent of xylene and 5 weight percent of a polyoxyethylated alkylphenol such as 12-polyoxyethylene para-nonylphenol or para-dodecylphenol.

The superior contact and systemic insecticidal properties of these compounds, as well as their preparation, are illustrated in the following example. This example is not in any way limiting.

EXAMPLE I

*1,4-dicarbethoxycyclohexadien-1,4-yl-2,5-bis-diethyl phosphate*

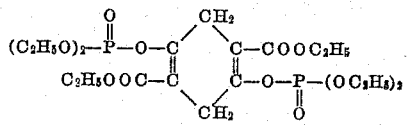

A solution of 0.95 gram of sodium metal in 40 milliliters of absolute ethanol was added to 5.3 grams of ethyl succino-succinate dissolved in 100 milliliters of absolute ethanol. The disodium salt of the succinylo-succinic ester precipitated immediately. The alcohol was distilled off in vacuum at 100° C. and the dry salt was powdered. A suspension of the powder in benzene was stirred at 70° C. while 7.15 grams of diethylchlorophosphate were added dropwise. The mixture was refluxed for two hours, after which the sodium chloride was filtered off. The benzene was removed in vacuum and the residue was dissolved in 30 milliliters of ether. This solution was washed three times with 10 milliliter portions of 10 percent sodium chloride solution and once with 5 milliliters of a saturated sodium bicarbonate solution. After drying the washed solution over sodium sulfate, the solvent was distilled off and 7.5 grams (68 percent of the theory) of a clear brown oil with a pleasant odor remained. The 1,4-dicarbethoxycyclohexadien - 1,4 - yl - 2,5 - bis - diethyl phosphate could not be distilled without decomposition even in high vacuum.

|  | P, percent |
|---|---|
| Calculated for $C_{20}H_{34}O_{12}P_2$ | 11.73 |
| Found | 11.13 |

Various modifications can be made in the procedure of the specific example to provide other compounds which fall within the scope of our invention and which are useful insecticides. Thus, in place of the ethyl succino-succinate there can be substituted other alkyl succino-succinates, such as methylsuccino-succinate, isopropylsuccino-succinate, n-butylsuccino - succinate, n-amylsuccino-succinate and so forth. Likewise, in place of the diethylchlorophosphate there can be substituted other dialkyl halophosphates or dialkylhalothionophosphates wherein the alkyl radicals contain from 1 to 5 carbon atoms, for instance, dimethylchlorophosphate, diisopropylchlorophosphate, di-n-butylchlorophosphate, diisoamylchlorophosphate, dimethylchlorothionophosphate, di - n - butylchlorothionophosphate, and the like.

We claim:

1. The compounds of the general formula:

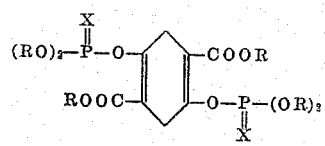

wherein X is selected from the group consisting of oxygen and sulfur and wherein the R's are alkyl radicals having from 1 to 5 carbon atoms.

2. The compound of claim 1 wherein X is oxygen and R is ethyl.

No references cited.